UNITED STATES PATENT OFFICE.

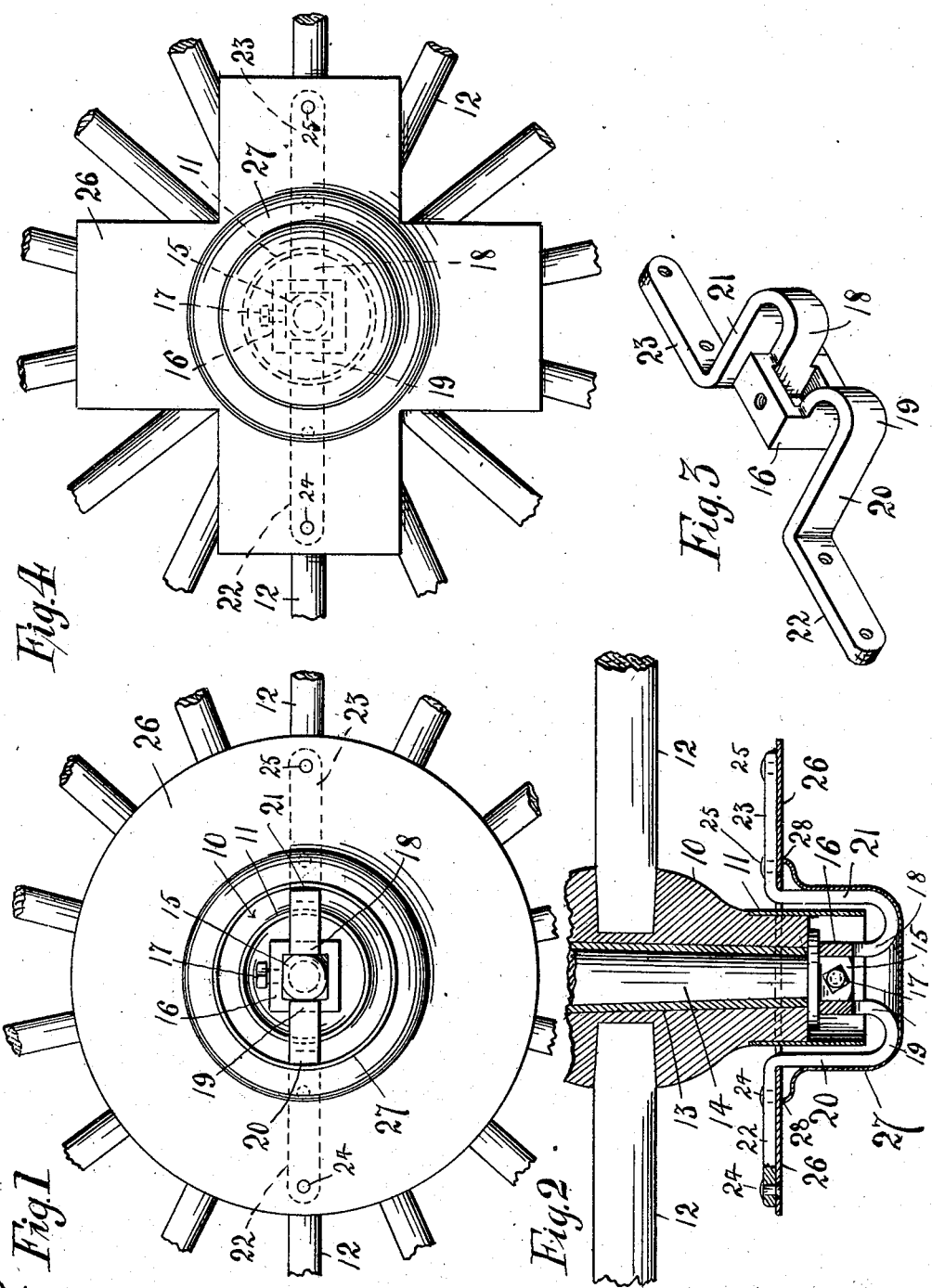

CHESTER C. PHELPS, OF SALT LAKE CITY, UTAH.

ATTACHMENT FOR VEHICLE-WHEELS.

No. 889,805. Specification of Letters Patent. Patented June 2, 1908.

Application filed October 25, 1907. Serial No. 399,207.

*To all whom it may concern:*

Be it known that I, CHESTER C. PHELPS, a citizen of the United States, residing at Salt Lake City, in the county of Salt Lake and State of Utah, have invented certain new and useful Improvements in Attachments for Vehicle-Wheels, of which the following is a specification.

This invention relates to attachments for vehicle wheels for the purpose of enabling the hub retaining nuts to be readily detached from and applied to the threaded end of the axle and without interfering with the hub or other parts of the axle.

Another object of the invention is to provide a simply constructed device adapted to be attached to the hub holding nut and to provide protection to the outer end of the hub and the nut, and likewise to provide protection to the inner portions of the spokes, and incidentally to provide a convenient means to display advertising matter.

With these and other objects in view, the invention consists in certain novel features of construction as hereafter shown and described and specifically pointed out in the claims, and in the drawings employed for illustrating the embodiment of the invention:—

Figure 1 is a side elevation of a portion of a wheel and its hub with the improved device attached to the holding nut of the same, a portion of the improved attachment being in section. Fig. 2 is a sectional view of the invention, as illustrated in Fig. 1. Fig. 3 is an enlarged perspective view of a portion of the improved attachment. Fig. 4 is a side view of a portion of a wheel with the improved device attached to its holding nut, illustrating a slight modification in the construction.

In the drawings 10 represents a portion of a hub with the outer band 11 projecting beyond the end of the axle, 12 the spokes, 13 the axle skein, 14 the axle bearing, and 15 the hub holding nut upon the threaded end of the axle, all of these parts being of the usual form or configuration, and it will be understood that the invention is not necessarily limited to the construction of hub and axle shown, as the invention is equally applicable to all forms of hubs having the holding nuts 15.

The improved device comprises a central rectangular collar 16 inclosing the nut 15 and conforming thereto, and secured detachably to the nut, as by a set screw 17. Extending from the sides of the collar 16 are bars or arms 18—19 bent outwardly and then extended inwardly, as at 20—21, toward the spokes 12 and in spaced relation to the band 11 and thence extended outwardly, as at 22—23. Attached as by rivets 24—25 to the outwardly extending portions of the arms is a plate 26, which may be in circular form, as in Fig. 1, or in the form of a Greek cross, as in Fig. 4, or of any other desired shape. The member 26 is provided with a central opening surrounding the hub band 11, and bearing over the portions 18—19—20—21 of the supporting arms is a cap 27, the inner edges of the cap bearing closely against the member 26, as at 28. The cap 27 may be of any desired ornamental form or configuration, and will preferably be of sheet metal, the sheet metal being plated, or otherwise protected or ornamented, as may be desired. By this simple arrangement, a convenient means is provided whereby the nut 15 may be readily attached or detached without the necessity for employing a separate wrench or other implement, while at the same time the members 26 and 27 provide ample protection to the outer end of the hub and its holding nut, and likewise form a guard to the spokes 12. The parts of the device are all of metal, and the member 16 and its metal arms are of sufficient strength to firmly support the members 26—27 in position, and prevent their displacement by any blows or shocks to which they may be subjected.

The surfaces of the member 26 may be utilized in any suitable manner for the display of the advertising matter, and thus increase its utility.

The improved device may be constructed of any desired size and modified slightly without departing from the principle of the invention within the scope of the appended claims to adapt the device to the various forms and sizes of hubs employed upon vehicles of the various kinds. The member 26 may be arranged at any required distance from the spokes 12.

Having thus described the nature of the invention, what is claimed as new is:—

1. An attachment for the holding nuts of hubs comprising a central collar adapted to bear detachably over the nut and closely engaging the same and provided with arms at the sides extending outwardly therefrom and bent in opposite directions and thence inwardly in spaced relation to the collar and thence outwardly in opposite directions, a plate having a central opening adapted to encircle the hub and connected to the outwardly extending portions of said arms, and means for detachably connecting said collar to the nut.

2. An attachment for the holding nuts of hubs comprising a central collar adapted to bear detachably over the nut and closely engaging the same and provided with arms at the sides extending outwardly therefrom and bent in opposite directions and thence inwardly in spaced relation to the collar and thence outwardly in opposite directions, a plate having a central opening adapted to encircle the hub and connected to the outwardly extending portions of said arms, a cap bearing over the inwardly extending portions of said arms and bearing by its inner edges upon said plate, and means for detachably connecting said collar to the nut.

3. An attachment for the holding nuts of hubs comprising a central collar adapted to bear detachably over the nut and closely engaging the same and provided with arms extending in opposite directions therefrom, and a plate having a central aperture adapted to bear over the outer portion of a wheel hub and connected to said arms, and means for detachably connecting said collar to a hub nut.

4. An attachment for the holding nuts of hubs comprising a central collar adapted to bear detachably over the nut and closely engaging the same and provided with arms extending in opposite directions therefrom, a plate having a central aperture adapted to bear over the outer portion of the wheel hub and connected to said arms, a cap connected to said plate and inclosing the aperture therein and also inclosing the collar and its nut and the projecting portion of the hub, and means for detachably connecting said collar to a hub nut.

In testimony whereof I affix my signature, in presence of two witnesses.

CHESTER C. PHELPS.

Witnesses:
 HYRUM BURK,
 JAMES B. THOMSON.